(12) United States Patent
Madumbu

(10) Patent No.: US 9,819,833 B2
(45) Date of Patent: Nov. 14, 2017

(54) METHOD FOR CONVERTING AN IMAGE, DRIVER ASSISTANCE SYSTEM AND MOTOR VEHICLE

(71) Applicant: Connaught Electronics Ltd., Tuam, County Galway (IE)

(72) Inventor: Venugopala K. Madumbu, Bangalore (IN)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 15/513,674

(22) PCT Filed: Sep. 25, 2015

(86) PCT No.: PCT/EP2015/072100
§ 371 (c)(1),
(2) Date: Mar. 23, 2017

(87) PCT Pub. No.: WO2016/046369
PCT Pub. Date: Mar. 31, 2016

(65) Prior Publication Data
US 2017/0264788 A1    Sep. 14, 2017

(30) Foreign Application Priority Data
Sep. 26, 2014 (DE) .................. 10 2014 113 957

(51) Int. Cl.
*H04N 7/18* (2006.01)
*H04N 1/60* (2006.01)
(Continued)

(52) U.S. Cl.
CPC ............. *H04N 1/6005* (2013.01); *B60R 1/00* (2013.01); *H04N 1/646* (2013.01); *H04N 9/04* (2013.01); *B60R 2300/30* (2013.01)

(58) Field of Classification Search
CPC ............. H04N 7/185; H04N 7/18; H04N 9/04; H04N 1/6005; H04N 1/646; B60R 1/00;
(Continued)

(56) References Cited

U.S. PATENT DOCUMENTS

| 8,655,086 B1 | 2/2014 | Christensen et al. |
| 2007/0053424 A1 | 3/2007 | Uro |

(Continued)

FOREIGN PATENT DOCUMENTS

CN    102 103 463 A    6/2011

OTHER PUBLICATIONS

International Search Report issued in corresponding application No. PCT/EP2015/072100 dated Dec. 16, 2015 (2 pages).
(Continued)

*Primary Examiner* — Sherrie Hsia
(74) *Attorney, Agent, or Firm* — Osha Liang LLP

(57) ABSTRACT

The invention relates to a method for converting (S1) an image (7) by an evaluation unit (4) of a motor vehicle (1), wherein the image (7) is captured from an environmental region (6) of a motor vehicle (1) by a camera (3) of the motor vehicle (1), and the image (7) includes an alpha channel (12) and at least one color channel in a predetermined color model, and the image (7) is converted into an alpha channel (12) and a Y channel (9) of a YUV color model and a U channel (10) of the YUV color model and a V channel (11) of the YUV color model, wherein in converting the image (7), the alpha channel (12) and the Y channel (9) and the U channel (10) and the V channel (11) are embedded in a converted image (8) of the image (7).

13 Claims, 2 Drawing Sheets

Figure 3:
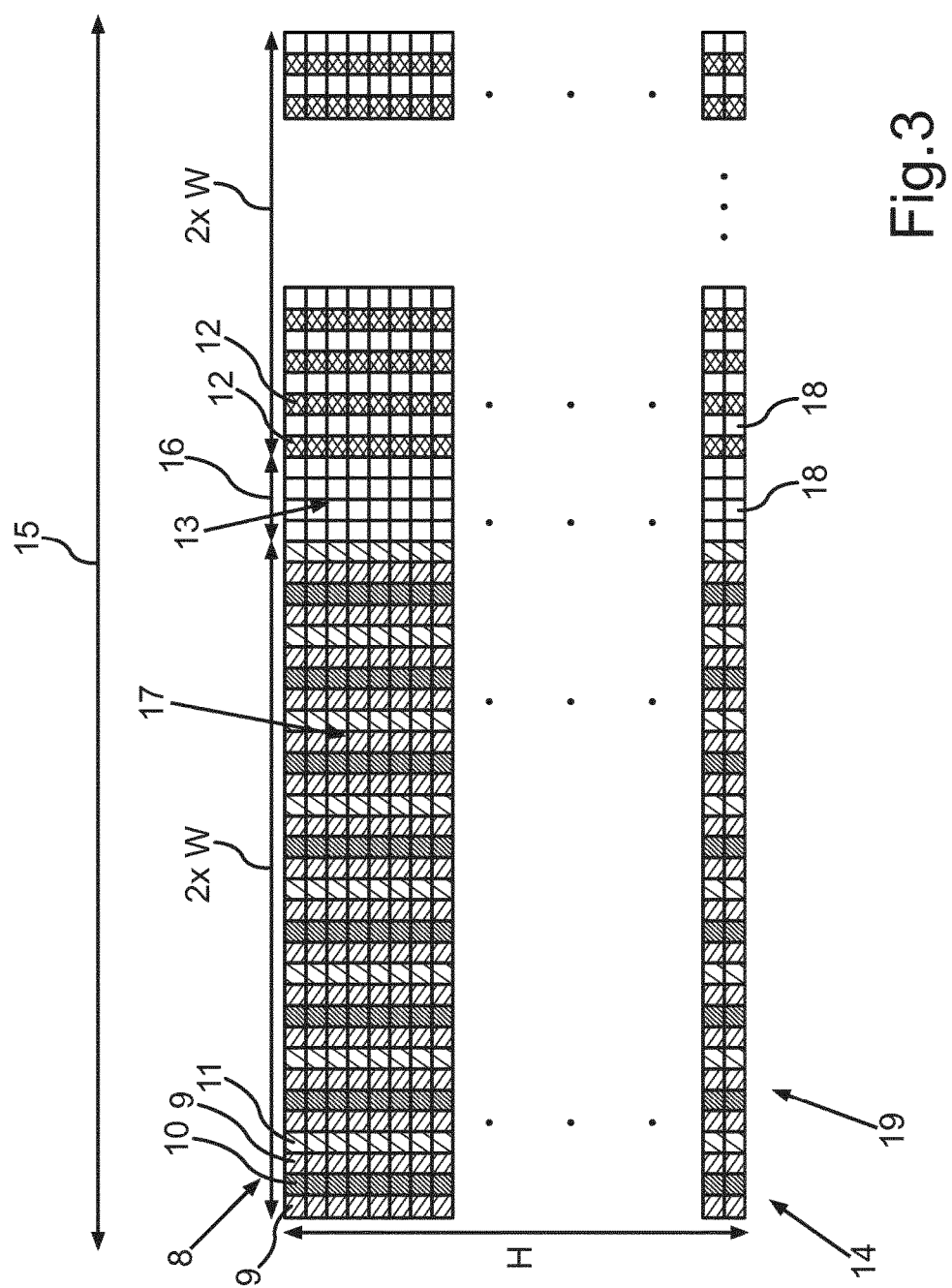

(51) Int. Cl.
*H04N 1/64* (2006.01)
*H04N 9/04* (2006.01)
*B60R 1/00* (2006.01)

(58) Field of Classification Search
CPC ........ B60R 2300/30; B60R 2001/1253; B60R 230/802; B60R 2300/806
USPC ..... 348/453, 148, 118, 119; 340/903, 932.2, 340/933, 937, 939; 349/11; 345/600, 345/603, 604; 382/103, 104
See application file for complete search history.

(56) References Cited

U.S. PATENT DOCUMENTS

| | | | |
|---|---|---|---|
| 2012/0154591 A1* | 6/2012 | Baur | B60R 1/00 348/148 |
| 2012/0307151 A1 | 12/2012 | Hunleth | |
| 2014/0104408 A1* | 4/2014 | Nanba | G08G 1/164 348/119 |

OTHER PUBLICATIONS

Written Opinion of the International Searching Authority issued in corresponding application No. PCT/EP2015/072100 dated Dec. 16, 2015 (5 pages).

\* cited by examiner

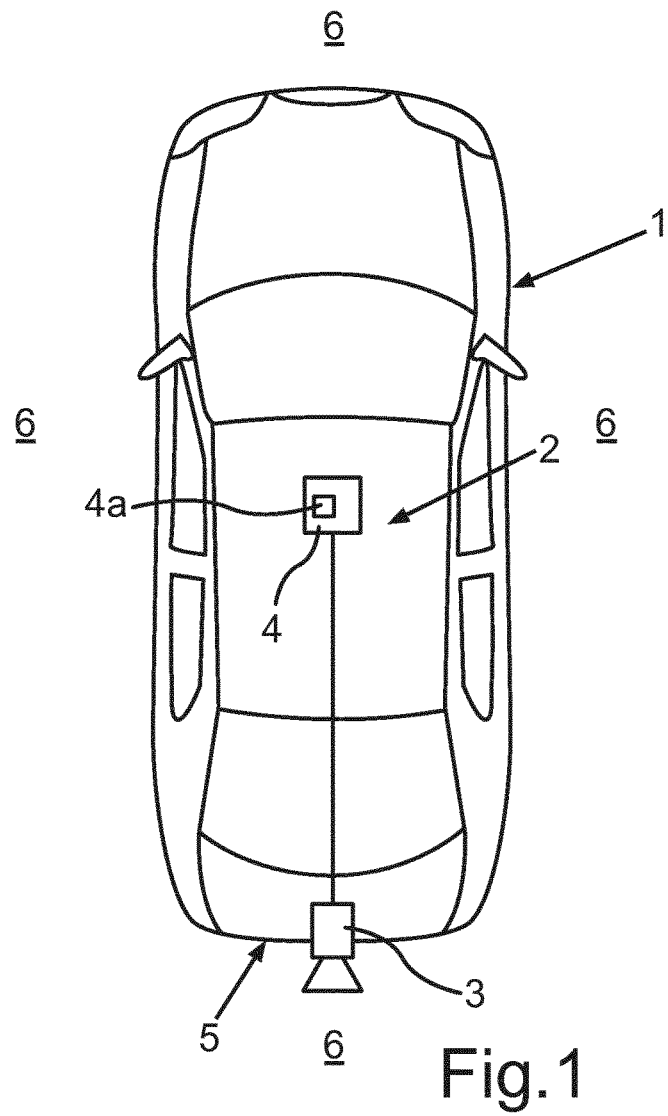
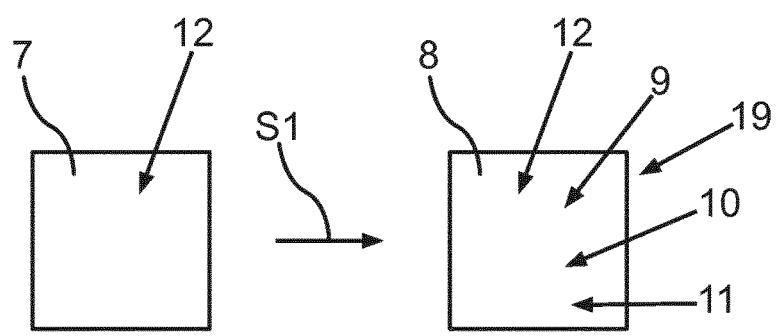
Fig.1
Fig.2

METHOD FOR CONVERTING AN IMAGE, DRIVER ASSISTANCE SYSTEM AND MOTOR VEHICLE

The invention relates to a method for converting an image by means of an evaluation unit of a motor vehicle, wherein the image is captured from an environmental region of a motor vehicle by means of a camera of the motor vehicle and the image includes an alpha channel and at least one color channel in a predetermined color model, and the image is converted into an alpha channel and a Y channel of a YUV color model and a U channel of the YUV color model and a V channel of the YUV color model. In addition, the invention relates to a driver assistance system for a motor vehicle as well as to a motor vehicle with a driver assistance system.

Methods for converting an image are known from the prior art. The conversion of the image is required if the image is to be transferred from one color model into another color model. There is a plurality of color models, wherein each color model has certain characteristics and thus advantages and disadvantages. Known color models are for example the RGB color model, the HSV color model and the YUV color model. In the RGB color model, a color value is described with each of the three channels. Thus, the R channel describes a red color value, the G channel describes a green color value and the B channel describes a blue color value. Presently, the interest is directed to the YUV color space. A Y channel of the YUV color space describes a brightness value or a luminance value, while a color value and a chrominance value, respectively, are described with a U channel of the YUV color model and a V channel of the YUV color model. Furthermore, the channels can be extended with an alpha channel. The alpha channel is an additional channel, which stores a transparency or a translucency of individual pixels of the image in addition to the color information and/or brightness information in raster graphics.

It is the object of the invention to provide a method, a driver assistance system as well as a motor vehicle, with which or in which the image of an environmental region of a motor vehicle is converted such that it can be particularly effectively further processed.

In a method according to the invention for converting an image by means of an evaluation unit of a motor vehicle, the image is captured from an environmental region of a motor vehicle by means of a camera of the motor vehicle. The image is provided with an alpha channel and at least one color channel in a predetermined color model. Furthermore, the image is converted into an alpha channel and a Y channel of a YUV color model and a U channel of the YUV color model and a V channel of the YUV color model. According to the invention, in converting the image, the alpha channel and the Y channel and the U channel and the V channel are embedded in a converted image of the image.

Thus, by the method according to the invention, it becomes possible that a data format of the image is provided, in which the alpha channel and the Y channel and the U channel and the V channel are collectively stored. After termination of the conversion, thus, the converted image is present, which includes four channels, namely the alpha channel, the Y channel, the U channel and the V channel. Thus, embedded in the converted image means that the converted image is present in a data format, which can be read in at a time. Thus, it is no longer required to first read in a part of the channels of the image, and after processing this one part of the channels, to read in another part of the channels of the image, to then also process it. Now, it is particularly advantageous that the alpha channel of the image now is also included in the converted image and is no longer separately stored as it occurs in the prior art. Thus, the converted image can be provided in a data format, which contains or describes both the YUV channels and the alpha channel. The alpha channel contains, as already mentioned, transparency information of the image.

As the YUV color model, which is usually used in the analog area, a YCbCr color model can presently also be understood, which predominantly is used in the digital area. The YCbCr color model was developed for the digital television according to the PAL standard, but is also used in the digital NTSC television today. In addition, it is used in the CCIR602 standard for digital image and video recording, in JPEG images, MPEG videos and thereby also DVDs, video CDs as well as most of the other video formats. The YCbCr color model is composed of a Y channel, a Cb channel and a Cr channel. The Cb channel is a measure of a deviation of the chromaticity of grey towards blue/yellow. The Cr channel is a corresponding measure towards red/cyan. Furthermore, it is to be noted that a color model is not yet a color space, because it does not yet determine, which colors exactly are meant. For a color space, the reference to absolute color values is additionally required.

Preferably, it is provided that the converted image is provided as a two-dimensional matrix, wherein by each element of the matrix the alpha channel or the Y channel or the U channel or the V channel or a zero value of a pixel of the converted image is described. The two-dimensional matrix can therefore define the data format of the converted image, in which the YUV channels and the alpha channel are disposed. Then, it is advantageous that this data format or this arrangement can be used in standardized manner to read in or process the converted image. Preferably, for an individual element or an individual value of the two-dimensional matrix, exclusively the alpha channel or the Y channel or the U channel or the V channel or a zero value is then possible. The zero value can either be zero or be set as another value, which functions as a variable.

In particular, it is provided that in the two-dimensional matrix, immediately at a column of the alpha channel at least one column with zero values is disposed. This means that the alpha channel can be disposed in the two-dimensional matrix column by column for the converted image, and after each column of the alpha channel, the column with zero values respectively follows. The columns of the alpha channel can thus be disposed in separated or spaced manner by means of the columns of the zero values.

Furthermore, it is provided that an RGB color model is described as the predetermined color model and an R channel and/or a G channel and/or a B channel are described as the at least one color channel. The RGB color model is a widespread color model, which often is used for self-luminous or color representing systems, which are subject to the principle of additive color mixing. Thus, the conversion or the transformation from the RGB color model to the YUV color model is an often used application. It is advantageous that the data format of the converted image supports a color model, which is widespread and thus can be often applied.

Preferably, it is provided that the image is provided in an ARGB data format. The ARGB data format includes an R channel and a B channel and a G channel and an alpha channel, wherein all of the four channels are embedded in the image. The exact construction of the ARGB data format can be taken from US 2012/0307151 A1. Thus, it is now advantageous that the image including four embedded channels can be converted into the converted image and the four channels are also embedded in the converted image. Thus, it is preferably provided that the image with the alpha channel and the R channel and the G channel and the B channel is converted into the converted image and the alpha channel and the Y channel and the U channel and the V channel are present in the converted image. Thus, it is now advantageous that thereby an image, which is present in a data format with an embedded alpha channel already before conversion, can be converted into the converted image with a data format also supporting the embedded alpha channel. Thus, the embedded alpha channel does not present any impediment in conversion.

Preferably, it is provided that the converted image is provided in an extended YUV422 data format, which includes a YUV422 data format and the alpha channel. The extended YUV422 data format is a YUV422 data format extended with the alpha channel. The YUV422 data format shares the U channel and the V channel with each two consecutive pixels of the converted image. Thus, for each pixel of the converted image, an own value of the Y channel is stored or registered, while two consecutive pixels each share a value of the U channel and the V channel or use the same value. However, alternatively, a YUV444 data format or a YUV411 data format is also possible as the basis for an extension with the alpha channel. In the YUV444 data format, for each pixel of the converted image, an own value of the U channel and the V channel is provided. In the YUV411 data format, four adjoining pixels each share a value of the U channel and the V channel. The YUV444 data format transfers 24 bits per pixel of the converted image. The YUV422 data format transfers 16 bits per pixel of the converted image. The YUV411 data format transfers 12 bits per pixel of the converted image. Thus, with the YUV422 data format, a lower amount of data can be generated than with the YUV444 data format because the color information of two adjoining pixels only has to be stored once. For the human eye, this almost does not make any difference since the human eye is more sensitive to brightness variations, thus high and low frequencies, than to color differences. Thus, the coarser resolution of the color can be accepted without noticeable quality losses. The extended YUV422 data format thus benefits from the same advantages as the YUV422 data format and additionally from the extended alpha channel.

In particular, it is provided that in the converted image, a safety area void of information is disposed between the channels of the YUV color model and the alpha channel. The safety area void of information can be realized with the zero values. Thus, the value of a pixel of the converted image can be 0 or be set to 0 in the safety area void of information. The safety area void of information is preferably required to overcome an effect of a multi-phase filter and/or low-pass filter of the evaluation unit. The effect could be directed to the Y channel and/or the alpha channel. The safety area void of information can extend over multiple pixels or over multiple columns of pixels of the converted image. The safety area void of information separates the Y channel and the U channel and the V channel from the possibility of extending to embed or integrate the alpha channel.

Furthermore, it is provided that the conversion is performed with a software and a digital signal processor in the evaluation unit. For example, this can be effected with a system on a chip (SoC) or else a single-chip system. By a single-chip system, one understands the integration of all or a large part of the functions of a system on a chip, thus an integrated circuit on a semiconductor substrate. Therein, as a single-chip system, a combination of different elements (logic circuits, clocking, autonomous run-up, microtechnical sensors) is understood, which together provide a certain functionality. Preferably, thus, it is provided that the conversion from the image to the converted image is performed in a processor or the digital signal processor of the evaluation unit. The high flexibility arising by the conversion by means of software is advantageous therein.

In particular, it is provided that the converted image is processed with an application-specific integrated circuit (ASIC) of the evaluation unit in a further step. The application-specific integrated circuit is an electronic circuit realized as an integrated circuit. The function of the application-specific integrated circuit is thereby no longer variable. With great numbers of pieces, low manufacturing cost and an efficient and faster conversion than a functionally identical conversion of the software or in a microcontroller or in a system on a chip are advantageous therein. A further advantage of the application-specific integrated circuit can for example be a low required energy supply for converting the image to the converted image. Thus, the application-specific integrated circuit is formed for reading in and further processing the converted image with the alpha channel and the Y channel and the U channel and the V channel. The data format, which is thus generated or provided by the converted image, can thus be read in by the application-specific integrated circuit. In the prior art, this is not yet possible up to now, but the alpha channel has to be read in separately from the Y channel and the U channel and the V channel. Thus, it is advantageous in the converted image that it can now be transmitted to the application-specific integrated circuit at a time and thus processing time can be saved.

In particular, it is provided that the converted image is transmitted to the application-specific integrated circuit with all of the channels at the same time. This means that the alpha channel and the Y channel and the U channel and the V channel denoted as all of the channels of the converted image are transmitted to the application-specific integrated circuit at the same time. This is advantageous because thereby a read or write cycle occurs only once, which otherwise would have been to be effected sequentially. Furthermore, it is provided that the converted image is converted back into the predetermined color model after conversion. This means that the converted image, which has the alpha channel and the Y channel and the U channel and the V channel, is for example transformed and/or geometrically processed, and subsequently the transformed converted image is converted back into the predetermined color model, thus the color model before conversion. The conversion can then have been required in order to be able to transform the image by means of a certain application-specific integrated circuit, which is only adapted to read in or process the data format of the converted image, and which is not adapted to read in another data format. However, this is also advantageous in that with presence of the back-converted image, which then is for example present in an ARGB color model, it can be output to a self-luminous display.

Furthermore, it is provided that the converted image is transformed, in particular scaled. This is advantageous in that the converted image is particularly effectively transformed, in particular scaled, thus can be brought to another zoom level, by means of the evaluation unit.

Furthermore, it is provided that multiple of the converted images are transformed in parallel by means of the evaluation unit. This can for example be realized by composing the converted image with further converted images to a large converted image. The large converted image thus contains multiple of the converted images. Now, it is advantageous that the large converted image can be transmitted to the evaluation unit at a time thus with one read and/or write cycle. Thus, a faster and/or more effective further processing of the large converted image is possible. An operating effort of the hardware or of the application-specific integrated circuit of the evaluation unit can thus be restricted to a minimum.

A driver assistance system according to the invention for a motor vehicle includes at least one camera for providing an image of an environmental region of a motor vehicle and an evaluation unit, which is adapted to perform a method according to the invention.

A motor vehicle according to the invention, in particular a passenger car, includes a driver assistance system according to the invention.

The preferred embodiments presented with respect to the method according to the invention and the advantages thereof correspondingly apply to the driver assistance system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations.

Below, embodiments of the invention are explained in more detail based on schematic drawings.

There show:

FIG. 1 in schematic plan view an embodiment of a motor vehicle according to the invention with a driver assistance system;

FIG. 2 a schematic illustration of a conversion of an image to a converted image; and FIG. 3 a schematic illustration of the converted image with an alpha channel and a Y channel and a U channel and a V channel, which are embedded in the converted image.

In FIG. 1, a plan view of a motor vehicle 1 with a driver assistance system 2 according to an embodiment of the invention is schematically illustrated. The driver assistance system 2 includes a camera 3 and an evaluation unit 4 with an application-specific integrated circuit 4a in the embodiment. According to the embodiment in FIG. 1, the camera 3 is disposed on a rear 5 of the motor vehicle 1. However, the arrangement of the camera 3 is variously possible, however, preferably such that an environmental region 6 of the motor vehicle 1 can be captured.

The camera 3 can be a CMOS camera or else a CCD camera or any image capturing device, which is able to provide an image 7 of the environmental region 6 of the motor vehicle 1. Multiple such cameras 3 can also be employed. The camera 3 is a video camera, which continuously provides an image sequence of images 7. The image 7 is a frame. The evaluation unit 4 then processes the image sequence of the images 7 for example in real time.

The application-specific integrated circuit 4a is an electronic circuit, which is realized as an integrated circuit. The function of the application-specific integrated circuit 4a is thereby no longer variable.

The image 7 is for example present in an ARGB data format. This means that an alpha channel and an R channel and a B channel and a G channel are embedded in the image 7. The alpha channel is an additional channel, which stores a transparency or a translucency of the individual pixels of the image 7 in addition to brightness information and/or color information in raster graphics such as the image 7. A representation of the image 7 with the alpha channel on a background is for example referred to as alpha blending.

The image is converted preferably from the ARGB data format to an extended YUV422 data format by means of a color space transformation. Thus, the alpha channel and the R channel, which is used for the color red, and the G channel, which is used for the color green, and the B channel, which is used for the color blue, are converted into a converted image 8 of the image 7.

FIG. 2 shows the transformation from the image 7 to the converted image 8, which is performed in a step S1. According to the embodiment, the alpha channel is embedded both in the image 7 and the converted image. The image 7 is present in the ARGB data format, while the converted image 8 is present in the extended YUV422 data format. The extended YUV422 data format is a YUV422 data format with an alpha channel. The YUV422 data format shares the U channel and the V channel with each two consecutive pixels of the converted image. Thus, for each pixel of the converted image, an own value of the Y channel is stored or registered, while two consecutive pixels each share a value of the U channel and the V channel or use the same value.

The conversion means a different storage of the information of the image 7 in the converted image 8. With the different storage, for example, a new organization concept of the various channels and/or a decompression or compression can be associated, for example by combining redundant information of the image 7.

FIG. 3 shows the converted image 8 with a Y channel 9 and a U channel 10 and a V channel 11 and an alpha channel 12. Furthermore, the converted image 8 includes a safety area 13 void of information, which is disposed between the YUV channels 9, 10, 11 and the alpha channels 12.

In the embodiment according to FIG. 3, the converted image 8 is present in a data format, which depends on a two-dimensional matrix 14. The two-dimensional matrix 14 for example has an image height H of the converted image 8. Furthermore, the two-dimensional matrix 14 has a width 15, which is composed of a safety area width 16 and a four-fold image width W of the converted image 8. The four-fold image width W as a component of the width 15 results as follows. For a pixel 17 of the converted image 8, a value of the Y channel is provided and according to the YUV422 data format for two pixels 17 next to each other the same U channel and the same V channel. Thus, the width 15 of the two-dimensional matrix 14 can be restricted for the YUV channels 9, 10, 11 to two times the image width W. The safety area width 16 is added, which is four pixels 17 in the direction of the image width W or the width 15 according to the embodiment of FIG. 3.

Adjoining to the safety area 13 void of information, the alpha channel 12 extends, which has as many columns as the image 7 or the converted image 8 has. The columns of the alpha channel 12 are separated by columns with a zero value 18 and for example have a width of each one pixel 17. The zero value 18 can for example be 0, however, other values are also conceivable, which indicate that this zero value 18 does not contain any information content of the converted image 8. Thus, the safety area 13 void of information is for example also provided with the zero value 18.

A data format 19 of the converted image 8 according to FIG. 3 thus allows reading in the converted image 8 with an application-specific integrated circuit 4a of the evaluation unit 4. Thereby, in addition to the YUV channels 9, 10, 11, the alpha channel 12 can also be read into a memory of the evaluation unit 4 at a time or in one step.

The data format 19 or the extended YUV422 data format is preferably constructed as follows. First, there is a column of the Y channel 9, then a column of the U channel 10 follows, then a column of the Y channel 9, then a column of the V channel 11, then a column of the Y channel 9 again follows, and the procedure repeats until all of the columns of the converted image 8 for the Y channel 9 and the U channel 10 and the V channel 11 are passed or processed. Adjoining to the YUV channels 9, 10, 11, the safety area 13 void of information follows, which for example extends over four columns. Adjoining to the safety area 13 void of information on the other side than the YUV channels 9, 10, 11 the alpha channels 12 are disposed, which preferably are each separated by a column with zero values 18. This corresponds to a representation of the YUV422 data format, which is extended by the safety area 16 void of information and the alpha channel 12 or the columns of the alpha channel 12 and the columns with the zero values 18, which separate the columns of the alpha channel 12.

A conversion of the image 7 with for example the alpha channel 12 and the R channel and the B channel and the G channel to the converted image 8 with the alpha channel 12 and the YUV channels 9, 10, 11 can be mathematically described as follows.

The value of the alpha channel 12 each remains the same, that is the pixel 17 in the image 7 has the same value for the alpha channel 12 as the pixel 17 of the converted image 8. However, the RGB channels are converted. This can be effected as follows:

$$Y \text{ channel} = 0.299 * R \text{ channel} + 0.587 * G \text{ channel} + 0.114 * B \text{ channel}.$$

$$U \text{ channel} = (B \text{ channel} - Y \text{ channel}) * 0.493$$

$$V \text{ channel} = (R \text{ channel} - Y \text{ channel}) * 0.877$$

Furthermore, according to an embodiment, it is provided that the YUV color model is described as a YCbCr color model. Thus, the YCbCr color model can be described as follows:

$$Y \text{ channel} = R \text{ channel} * 0.1226 + G \text{ channel} * 0.7152 + B \text{ channel} * 0.0722$$

$$Cb \text{ channel} = 0.5 * (B \text{ channel} - Y \text{ channel})/(1 - 0.0722)$$

$$Cr \text{ channel} = 0.5 * (R \text{ channel} - Y \text{ channel})/(1 - Kr)$$

wherein Kr can for example be 0.299.

The equations for the color models are to be exemplarily understood and can be differently determined from application to application.

According to an embodiment, it is provided that the converted image 8 is transformed by means of an application-specific integrated circuit 4a of the evaluation unit 4 and finally, after transformation, is converted back into for example an ARGB data format. Due to the data format 19 of the converted image 8, all of the channels 9, 10, 11, 12 can be transmitted to the application-specific integrated circuit 4a of the evaluation unit 4 at the same time.

Furthermore, according to an embodiment, it is provided that multiple of the converted images 8 are combined or composed to a large converted image to thus transmit the large converted image at a time to the application-specific integrated circuit 4a. Thus, multiple of the converted images 8 can also be transmitted in parallel.

The invention claimed is:

1. A method for converting an image by an evaluation unit of a motor vehicle, wherein the image is captured from an environmental region of a motor vehicle by a camera of the motor vehicle, the method comprising:
   providing the image with an alpha channel and at least one color channel in a predetermined color model; and
   converting the image into the alpha channel and a Y channel of a YUV color model, a U channel of the YUV color model and a V channel of the YUV color model,
   wherein, in converting the image, the alpha channel, the Y channel, the U channel and the V channel are embedded in a converted image of the image provided as a two-dimensional matrix,
   wherein the alpha channel, the Y channel, the U channel, the V channel or a zero value of a pixel of the converted image is described by each element of the matrix,
   wherein in the converted image, a safety area void of information is disposed between the channels of the YUV color model and the alpha channel.

2. The method according to claim 1, wherein in the two-dimensional matrix, immediately at a column of the alpha channel, at least one column with zero values is disposed.

3. The method according to claim 1, characterized in that an RGB color model is described as the predetermined color model and an R channel, a G channel and/or a B channel are described as the at least one color channel.

4. The method according to claim 1, wherein the image is provided in an ARGB data format.

5. The method according to claim 1, wherein the converted image is provided in an extended YUV422 data format, which includes a YUV422 data format and the alpha channel.

6. The method according to claim 1, wherein the conversion is performed with a software and a digital signal processor in the evaluation unit.

7. The method according to claim 1, wherein the converted image is further processed with an application-specific integrated circuit of the evaluation unit.

8. The method according to claim 7, wherein the converted image is transmitted to the application-specific integrated circuit with all of the channels at the same time.

9. The method according to claim 1, wherein the converted image is converted back into the predetermined color model after the conversion.

10. The method according to claim 1, wherein the converted image is scaled by the evaluation unit.

11. The method according to claim 10, wherein multiple of the converted images are transformed in parallel by the evaluation unit.

12. Driver assistance system comprising: a camera; and an evaluation unit configured to perform a method according to claim 1.

13. A motor vehicle with a driver assistance system according to claim 12.

* * * * *